Figure 1:
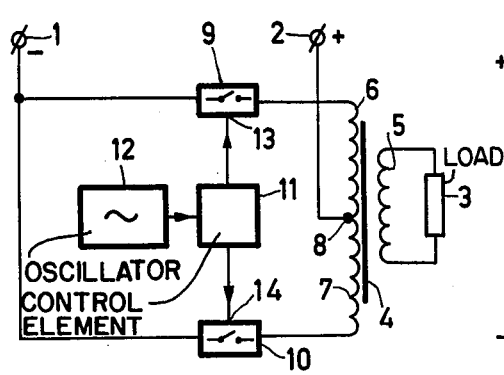

United States Patent [19]

Luursema

[11] Patent Number: 4,480,300
[45] Date of Patent: Oct. 30, 1984

[54] CONTROL CIRCUIT FOR A DC-AC CONVERTER

[75] Inventor: Meerten Luursema, Eindhoven, Netherlands

[73] Assignee: U.S. Philips Corporation, New York, N.Y.

[21] Appl. No.: 405,669

[22] Filed: Aug. 5, 1982

[30] Foreign Application Priority Data

Sep. 14, 1981 [NL] Netherlands ..................... 8104222

[51] Int. Cl.³ .......................................... H02M 7/537
[52] U.S. Cl. ...................................... 363/134; 363/97
[58] Field of Search ............................... 363/24–26, 363/55–57, 97, 131, 133–134

[56] References Cited

U.S. PATENT DOCUMENTS

| | | | |
|---|---|---|---|
| 3,611,330 | 10/1971 | Cacossa | 363/97 X |
| 3,873,903 | 3/1975 | Koetsch et al. | 363/25 |
| 4,233,658 | 11/1980 | Lupatin et al. | 363/134 X |
| 4,351,020 | 9/1982 | Leti et al. | 363/134 X |

Primary Examiner—Peter S. Wong
Attorney, Agent, or Firm—Robert T. Mayer; Bernard Franzblau

[57] ABSTRACT

A control circuit for a DC-AC converter which improves the efficiency of the converter and enables it to operate at a higher frequency using the same semiconductor switches. The residual voltage across the conductive switch (9, 10) of the converter is compared with a reference voltage (23) via an analog OR-gate (26) and the control signal for the conductive switch is controlled such that the residual voltage is set to a desired value.

9 Claims, 5 Drawing Figures

CONTROL CIRCUIT FOR A DC-AC CONVERTER

This invention relates to a control circuit for two semiconductor switches of a d.c.-a.c. converter, which semiconductor switches are controlled in push-pull and each comprise a main current path and a control input, said main current paths alternately being conductive when a control signal from the control circuit appears on the control input of the relevant semiconductor switch and the control circuit further comprising a control element for adjusting the control signal to a desired value.

Said converter may serve to convert a direct voltage or semi-direct voltage from a full-wave rectified alternating-voltage source into an alternating voltage whose frequency generally ranges between 20 and 100 kHz but may also be a few hundred Hz. The resulting waveform may be a sinewave or a squarewave and may be used for directly feeding a load. Such a circuit is frequently used in conjunction with a transformer in order to obtain d.c. isolation or voltage transformation. The switches, which connect the direct-voltage source to the load or to the transformer may be arranged as a bridge circuit or in push-pull, the transformer to be used having a primary centre tap for connection to one of the power-supply terminals in the latter case.

A converter of the last-mentioned type is described in German Patent Specification DE-OS No. 28 17 319 and, as in the present Application, relates to a control circuit for a converter.

The known control circuit provides a solution to the problem of the high dissipation which is liable to occur in the control circuit as a result of the current required as the control signals of the switches.

The invention proposes a better solution of the said problem.

To this end the control circuit, according to the invention, is characterized in that it comprises a comparator circuit having an output connected to the control element, having one input connected to a reference voltage, and having the other input connected to the output of an analog OR-gate having a first input connected to one semiconductor switch current path and a second input connected to the other semiconductor switch main current path. The comparator circuit compares at least a part of the residual voltage across the conductive main current path with the reference voltage and in the case of a deviation controls the control element so as to obtain a desired value of the residual voltage.

These steps yield the following advantages.
(1) The voltage drop in the main current circuit has a constant value which is independent of the load current. This minimizes the risk that the dissipation limit of the switch will be exceeded because the voltage drop becomes too large when the load current is large, for example, in the case of a transistor, when it comes out of saturation, because of a constant base control current.
(2) Oversaturation does not occur when the residual voltage is small. This might otherwise happen when the load current is small with the same, now relatively high, control current. The result is that the switch may be set to a residual voltage which yields a fast switching time under varying load conditions so that the converter can operate at a substantially higher frequency than the known converter.
(3) The control signal is optimized automatically. Therefore, in contrast to the known converter, it need not be made large to cope with "worse case" conditions: for example highest (or lowest) temperature, smallest possible gain factor between control current and load current, aging effects, high or low supply voltage etc. This results in an economic drive, thereby improving the converter efficiency at smaller load currents. Generally this results in less stringent cooling requirements, which lead to a reduction in converter volume.

A suitable embodiment of the invention, in which one terminal of the d.c. supply and one end of each main current path are connected to ground, is characterized in that the analog OR-gate comprises a resistor having one end connected to a power-supply source having the same polarity relative to ground as the d.c. source. The other end of the resistor is connected to the output terminal of the OR-gate and at least one diode is connected between said output terminal and the other end of each main current path.

This greatly simplifies the analog OR-gate. It is an advantage that the residual voltage, which is already low, is increased by one or more diode forward voltages which may be regarded as constant and whose temperature dependence may be utilized in order to compensate for a similar dependence of a source supplying the reference. The resulting higher output voltage of the OR-gate is easier to process in the comparator circuit.

In a particular embodiment of the invention the comparator circuit is extremely simple, namely a transistor. Comparison is effected in the base-emitter junction, i.e. the base-emitter diode supplies the reference voltage and the collector supplies a control signal. Such a control circuit is characterized in that the comparator circuit is a transistor whose emitter is connected to ground, whose base is connected to the tap of a voltage divider which is connected to the output of the OR-gate, and whose collector is connected to the control element.

Suitable control can be obtained in certain converters if the control element is a current-source arrangement comprising a transistor whose emitter is connected to a power supply source via a resistor, whose base is connected to the output of the comparator circuit, and whose collector is connected to the control input of one of the semiconductor switches.

Figure 2:
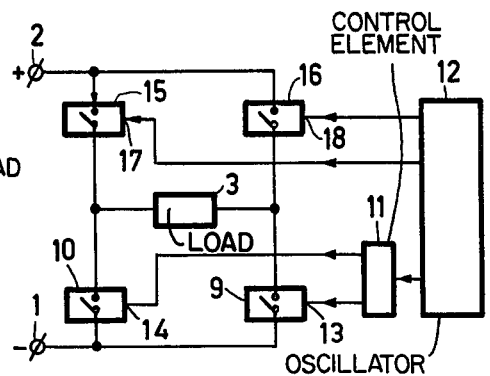
Figure 3:
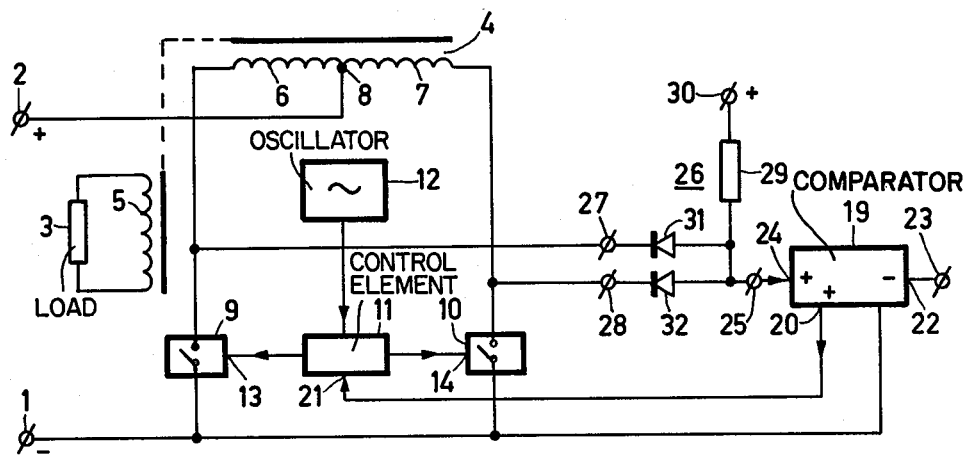
Figure 5:
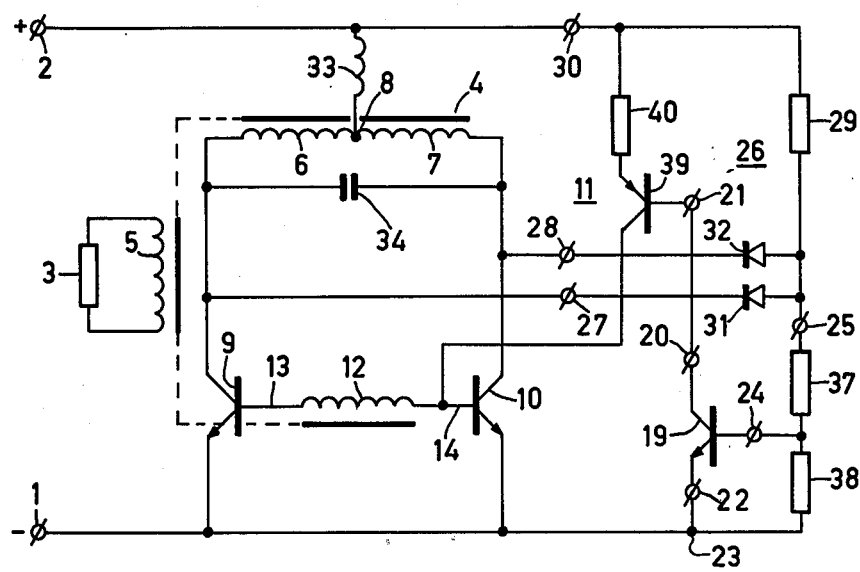

It is to be noted that FIG. 3 and FIG. 5 of the German Patent Specification DE-OS No. 28 52 943 show a circuit in which a control element for controlling the switch is also influenced by a residual voltage across a semiconductor switch. However, the setting and the circuit arrangement are different and the object pursued with FIG. 2 and FIG. 6 with the Table is completely different. Moreover, the analog OR-gate is absent and the circuit is not used for d.c.-a.c. converters. The same applies to the circuit arrangement of U.S. Pat. No. 4,109,166, where excess control current in the main current path is dumped, the entire circuit arrangement being dimensioned for "worst case" conditions.

Figure 4:
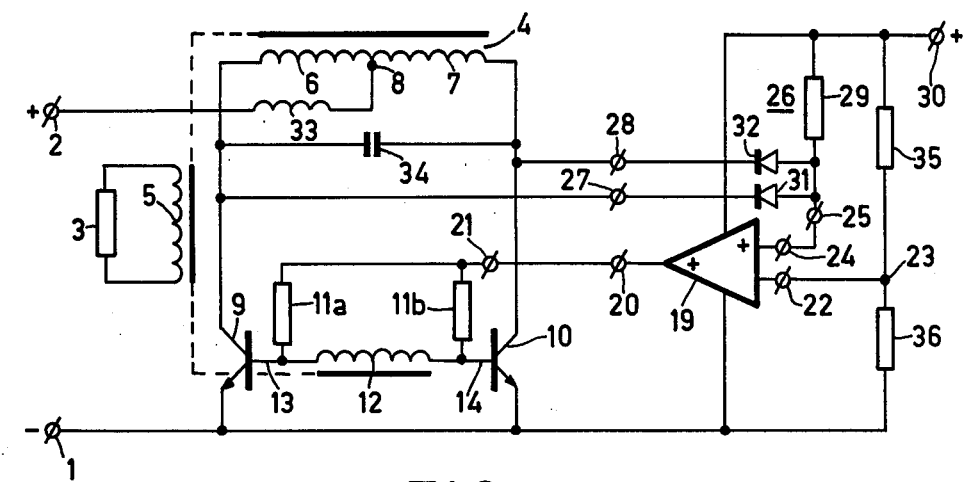

The invention will now be described in more detail, by way of example, with reference to the drawings. In the drawings:

FIG. 1 and FIG. 2 are block diagrams of known converters, in which a control circuit in accordance with the invention may be used, FIG. 3 is a block diagram of a control circuit in accordance with the invention, and FIG. 4 and FIG. 5 show control circuits in accordance with the invention in more detail.

The converter of FIG. 1 converts the direct voltage from a source connected between terminals 1 and 2 into an alternating voltage which is available across the load 3 via the transformer 4 having a secondary winding 5 and primary windings 6 and 7. Terminal 2 is connected to the common point 8. The primary windings 6 and 7 are alternately connected to terminal 1 by semiconductor switches, such as transistors, 9 and 10, the respective main current paths being disposed between terminal 1 and winding 6 and terminal 1 and winding 7. The control signal for turning on one of the two switches at a time is supplied by a control element 11, which is controlled by an oscillator 12, so that the control input 13 of the switch 9 and the control input 14 of the switch 10 receive control signals alternately.

The converter of FIG. 2 comprises the same elements as the converter of FIG. 1, these being denoted by the same reference numerals. However, a transformer with a primary centre tap is not now required. The load 3 may be connected directly or via a transformer having one primary winding. The semiconductor switches are arranged as a bridge, as is indicated by the additional switches 15 and 16 having respective control inputs 17 and 18 which are connected to the oscillator 12. The invention may be used in conjunction with the switches 9 and 10 and the control element 11, and, if desired, also the switches 15 and 16, although a control current in their inputs 17 and 18 goes to the load 3. It is assumed that inputs 13 and 14 receive current from the control element 11.

FIG. 3 is a block diagram of a control circuit in accordance with the invention used in a converter as shown in FIG. 1. A comparator circuit 19 has an output 20 connected to the control element 11, which for this purpose includes an input 21. One input 22 of the comparator circuit 19 is connected to a reference voltage applied to a terminal 23, the other input 24 being connected to the output 25 of an analog OR-gate 26 having a first input 27 connected to the main current path of switch 9 and having a second input 28 connected to the main current path of the switch 10. The analog OR-gate 26 comprises a resistor 29 having one end connected to a power-supply source 30 of the same polarity as the direct current source connected to terminal 2, terminal 1 being connected to the converter ground. The other end of the resistor 29 is connected to the output 25 and to the anodes of two diodes 31 and 32, whose cathodes are connected to input 27 and input 28 respectively. It will be evident that the diode which is conductive at any given time is the diode which is connected to the currently conducting main current path. The other diode is then cut off. The residual voltage from the conductive switch, augmented by the forward voltage of one of the diodes 31 and 32, appears at the output 25 and consequently at input 24. An increase of this voltage, compared with the reference voltage at input 22 of the comparator circuit 19 will yield a correction signal at output 20 for the input 21 of the control element 11, so that a larger control signal is applied to input 13 or input 14. As a result of this the residual voltage will be reduced.

FIG. 4 is the diagram of a converter which produces a sinewave voltage. For this purpose a choke 33 is arranged in the line from terminal 2 to tap 8 and a capacitor 34 is arranged across the complete primary 6+7. A third winding 12 of the transformer is arranged between the control inputs 13 and 14 in order to ensure that the converter signal turns off one switch and turns on the other switch in the correct phase. The amplitude of the control signal is adjusted by energizing the control element, which comprises two resistors 11a and 11b, via input 21 which is connected to output 20 of the comparator 19. The reference voltage on terminal 23 is obtained by dividing the supply voltage on terminal 30 by means of the divider comprising the resistors 35 and 36.

The converter with control circuit as shown in FIG. 5 is a simplified version of the circuit of FIG. 4. The comparator circuit 19 is a transistor whose emitter is connected to input 22, point 23 being connected to ground. The base of the transistor is connected to input 24 and receives information about the residual voltage from output 25 of the analog OR-gate 26 via the divider comprising the resistors 37 and 38.

In the same way as in FIG. 4, wherein a desired residual voltage is obtainable by varying the divider 35-36 which determines the reference voltage, the residual voltage in FIG. 5 can be determined by means of the divider 37-38, which supplies a portion of the residual voltage to the comparator 19, the base-emitter voltage of the transistor serving as a fixed reference voltage. The control element 11 comprises a current source in the form of a transistor 39 and an emitter resistor 40. The current supplied to the input 14 by the collector of the transistor 39 for turning on the transistor 10 is also applied to input 13 of transistor 9 via winding 12 depending on the polarity of the voltage across winding 12. The said current is determined by the emitter resistor 40 and the voltage of source 30 which is equal to the voltage of source 1-2, together with the voltage applied to terminal 21 from output 20 of the comparator 19.

The load of the d.c.-a.c. converter may be a rectifier circuit, possibly with a filter and a d.c. load connected thereto.

What is claimed is:

1. A control circuit for two semiconductor switches of a d.c.-a.c. converter, which semiconductor switches are controlled in push-pull and each comprise a main current path and a control input, said main current paths being conductive alternately when a control signal from the control circuit appears on the control input of the relevant semiconductor switch, the control circuit comprising; a control element for adjusting the control signal to a desired value, a comparator circuit having an output connected to the control element, one input connected to a reference voltage, and the other input connected to an output of an analog OR-gate having a first input connected to one semiconductor switch main current path and a second input connected to the other semiconductor switch main current path, the comparator circuit comparing at least a part of a residual voltage appearing across the conductive main current path with the reference voltage and in the case of a deviation controlling the control element so as to obtain a desired value of the residual voltage.

2. A control circuit as claimed in claim 1, for use in a d.c.-a.c. converter which comprises a common line connected to ground and to which one terminal of the d.c. supply and one end of each semiconductor switch main current path is connected, characterized in that the analog OR-gate comprises a resistor having one end connected to a power-supply source having the same polarity relative to ground as the direct current supply and whose other end is connected to the output of the OR-gate, and at least one diode being coupled between said output of the OR-gate and the other end of each semiconductor switch main current path.

3. A control circuit as claimed in claim 2, wherein the comparator circuit comprises a transistor having an emitter connected to ground, a base connected to a tap on a voltage divider connected to the output of the OR-gate, and a collector connected to the control element.

4. A control circuit as claimed in claims 2 or 3, for a d.c.-a.c. converter in which the control inputs are interconnected directly by means of a transformer winding, characterized in that the control element comprises a current-source including a transistor having an emitter connected to a power-supply source via a second resistor, a base connected to the output of the comparator circuit, and a collector connected to the control input of one of the semiconductor switches.

5. A control circuit as claimed in claim 1 wherein the control inputs are interconnected directly by means of a transformer winding, characterized in that the control element comprises a current source including a transistor having an emitter connected to a power supply source via a resistor, a base connected to the output of the comparator circuit, and a collector connected to the control input of one of the semiconductor switches.

6. A d.c./a.c. converter comprising: first and second semiconductor switches each including a control input and a main current path, means including said first and second semiconductor switches for coupling a source of direct voltage to a load, a control circuit for applying a control signal to the control inputs of the first and second semiconductor switches so as to make the main current paths of said semiconductor switches alternately conductive, wherein said control circuit comprises; a control element for adjusting the control signal to a desired value, a comparator circuit having first and second inputs connected to a source of reference voltage and to an output of an OR-gate, respectively, means connecting an output of the comparator circuit to said control element, means connecting first and second inputs of the OR-gate to the main current paths of the first and second semiconductor switches, respectively, and wherein the comparator circuit compares at least a part of a residual voltage developed across the main current path of a conductive semiconductor switch with said reference voltage to derive an output signal to control said control element in a manner so as to derive a desired value of the residual voltage.

7. A converter as claimed in claim 6 wherein one end of each semiconductor switch main current path and one terminal of the direct voltage source are connected to a common circuit point, and said OR-gate comprises a resistor having one end connected to a source of direct voltage of the same polarity as that of the other terminal of the direct voltage source relative to said common circuit point, means connecting the other end of said resistor to the output of the OR-gate, and second means coupling first and second diodes between said OR-gate output and said first and second inputs of the OR-gate, respectively, said first and second inputs of the OR-gate being connected to the other ends of the main current paths of the first and second semiconductor switches, respectively.

8. A converter as claimed in claim 7 wherein the first coupling means includes a transformer having a secondary winding coupled to the load and a primary winding having first and second terminals coupled to the main current paths of the first and second semiconductor switches, respectively, said primary winding having a center tap coupled to said other terminal of the direct voltage source, said transformer having a further winding coupled to the control inputs of the first and second semiconductor switches, and wherein the output of the comparator circuit is connected to the control inputs of the first and second semiconductor switches via first and second resistors, respectively.

9. A converter as claimed in claim 6 wherein the comparator circuit comprises a transistor having first and second main electrodes that define a main current path and a control electrode, a current-source including a second transistor having an output coupled to the control inputs of the semiconductor switches and a control electrode coupled to the first main electrode of the first transistor, the second main electrode of the first transistor being connected to one terminal of the direct voltage source and the control electrode of the first transistor being connected to a tap on a voltage divider which is in turn connected to the output of the OR-gate.

* * * * *